（12）United States Patent
Ostertag et al.

(10) Patent No.: US 10,549,392 B2
(45) Date of Patent: Feb. 4, 2020

(54) HAMMERING DEVICE FOR INFLUENCING WORKPIECES

(71) Applicant: ECOROLL AG WERKZEUGTECHNIK, Celle (DE)

(72) Inventors: Alfred Ostertag, Celle (DE); Stefan Zenk, Winsen (DE)

(73) Assignee: ECOROLL AG Werkzengtechnik, Celle (DE)

( * ) Notice: Subject to any disclaimer, the term of this patent is extended or adjusted under 35 U.S.C. 154(b) by 135 days.

(21) Appl. No.: 15/553,080

(22) PCT Filed: Feb. 24, 2016

(86) PCT No.: PCT/EP2016/053815
§ 371 (c)(1),
(2) Date: Aug. 23, 2017

(87) PCT Pub. No.: WO2016/135169
PCT Pub. Date: Sep. 1, 2016

(65) Prior Publication Data
US 2018/0036842 A1    Feb. 8, 2018

(30) Foreign Application Priority Data

Feb. 26, 2015  (DE) .................. 10 2015 203 487

(51) Int. Cl.
*B23P 9/04*        (2006.01)
*B24B 39/00*       (2006.01)
(Continued)

(52) U.S. Cl.
CPC .............. *B23P 9/04* (2013.01); *B24B 39/006* (2013.01); *B25D 11/062* (2013.01); *B25D 17/06* (2013.01); *C21D 7/04* (2013.01)

(58) Field of Classification Search
CPC ....... B25F 5/005; B25D 11/12; B25D 11/125; B25D 2216/0015; B25D 2217/0003;
(Continued)

(56) References Cited

U.S. PATENT DOCUMENTS

| 257,739 A | * | 5/1882 | Moreau | ................ B25D 11/102 |
|   |   |   |   | 173/101 |
| 1,222,663 A | * | 4/1917 | Penney | ................ B25D 11/102 |
|   |   |   |   | 173/101 |

(Continued)

FOREIGN PATENT DOCUMENTS

| AT |  | 364592 B |  | 10/1981 |
| CN |  | 85106839 A |  | 4/1986 |

(Continued)

*Primary Examiner* — Stephen F. Gerrity
*Assistant Examiner* — Joshua G Kotis
(74) *Attorney, Agent, or Firm* — W&C IP

(57) ABSTRACT

The invention relates to a hammering device for influencing the subsurfaces of workpieces comprising a beating tool for acting on the workpiece, a beating mechanism which has a first beater for producing a beating pulse on the beating tool, and a drive for driving the beating mechanism, wherein the beating mechanism has at least a second beater for producing a beating pulse on the beating tool. According to the invention, it is intended for the beating mechanism to comprise a drive shaft that extends along a drive axis and a wobble ring for transforming a rotational movement of the drive shaft into a translational movement, and the first beater and the second beater to be driven by the wobble ring.

9 Claims, 6 Drawing Sheets

(51) Int. Cl.
  *B25D 11/06* (2006.01)
  *C21D 7/04* (2006.01)
  *B25D 17/06* (2006.01)

(58) Field of Classification Search
  CPC .... B25D 2217/0007; B25D 2217/0026; B25D 2250/291; B25D 2250/275; B25D 2250/285; B25D 2211/06–2211/068; B25D 9/04; B25D 9/26; B25D 1/16; B25D 17/06; B25D 2250/345; B25D 11/062; B23P 9/04; B24B 39/003; B24B 39/006; B24B 39/023; B24B 39/026; B24B 23/04; B24B 23/043; B21H 7/18; C21D 7/04–7/08; C21D 9/30
  USPC ........ 72/76, 120; 173/101, 52, 213, 103, 95, 173/96, 112, 113, 114, 205; 74/76, 60
  See application file for complete search history.

(56) References Cited

U.S. PATENT DOCUMENTS

| | | | | |
|---|---|---|---|---|
| 2,836,272 | A * | 5/1958 | Kaman | B25B 21/026 173/93.6 |
| 4,682,489 | A * | 7/1987 | Bauerle | C21D 7/04 29/6.01 |
| 4,801,247 | A * | 1/1989 | Hashimoto | F04B 1/324 417/213 |
| 6,234,255 | B1 * | 5/2001 | Feldmann | B23D 49/162 173/114 |
| 8,789,283 | B2 * | 7/2014 | Sinur | B23D 51/16 173/114 |
| 2002/0014100 | A1 * | 2/2002 | Prokopenko | B24B 1/04 72/53 |
| 2004/0144551 | A1 * | 7/2004 | Koskimaki | B25D 9/18 173/1 |
| 2006/0042129 | A1 * | 3/2006 | Satake | E02F 9/2235 37/348 |
| 2009/0188686 | A1 * | 7/2009 | Keskiniva | B25D 9/26 173/1 |
| 2011/0036609 | A1 * | 2/2011 | Blickle | B24B 23/028 173/213 |
| 2011/0127055 | A1 * | 6/2011 | Braun | B25D 11/005 173/117 |

FOREIGN PATENT DOCUMENTS

| | | | |
|---|---|---|---|
| CN | 1853866 A | 11/2006 | |
| CN | 101062558 A | 10/2007 | |
| CN | 101903133 A | 12/2010 | |
| CN | 101970182 A | 2/2011 | |
| DE | 362326 C | 10/1922 | |
| DE | 967868 C | 12/1957 | |
| DE | 102005021793 A1 * | 11/2006 | B21H 7/185 |
| DE | 10 2006 058 710 A1 | 6/2008 | |
| DE | 10 2013 002495 A1 | 10/2013 | |
| EP | 1607186 A1 * | 12/2005 | B25D 11/005 |
| EP | 1980371 A1 * | 10/2008 | B25D 11/125 |
| EP | 2450155 A1 * | 5/2012 | B23P 9/04 |
| WO | 2005/092575 A1 | 10/2005 | |

* cited by examiner

Section C - C

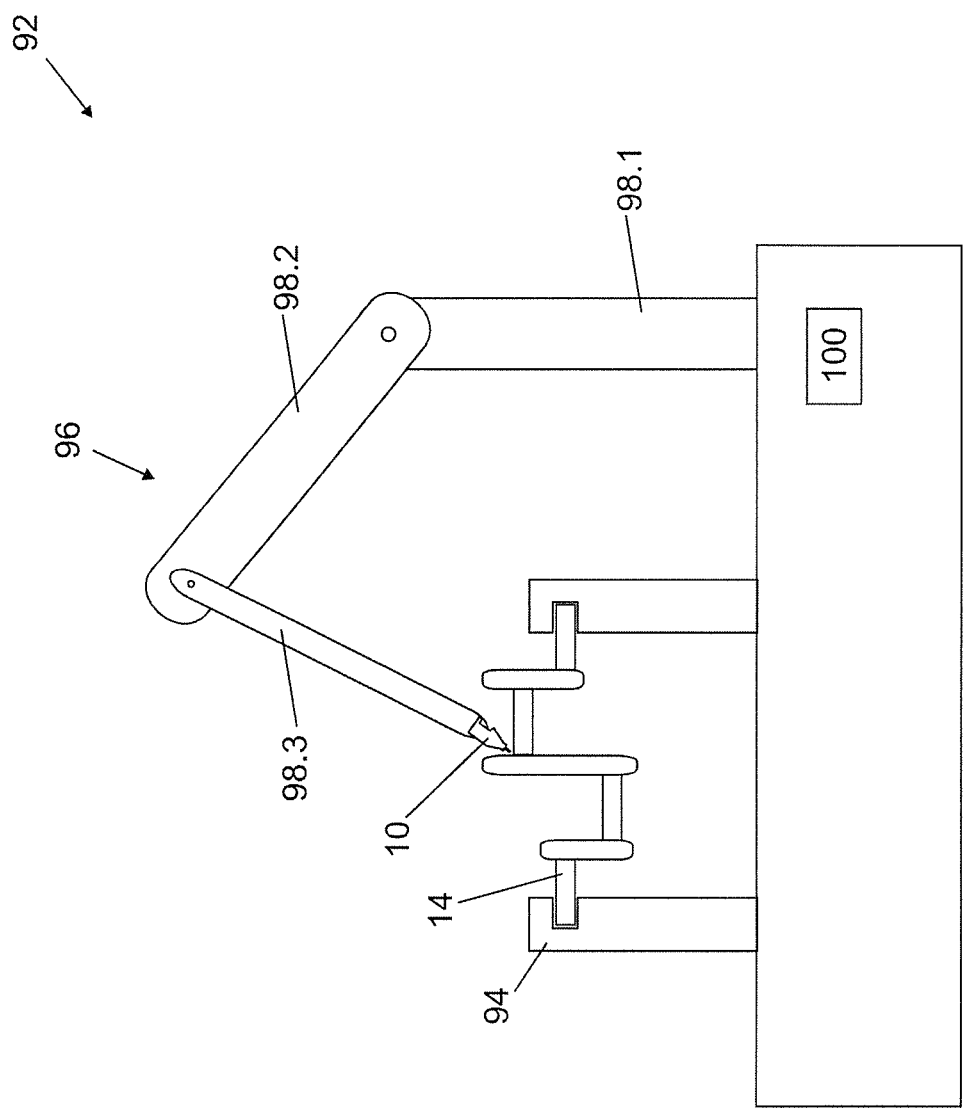

HAMMERING DEVICE FOR INFLUENCING WORKPIECES

BACKGROUND OF THE INVENTION

Field of the Invention

The invention relates to a hammering device for influencing workpieces, particularly the subsurface, comprising (a) a beating tool for acting on the workpiece, (b) a beating mechanism which has a beater for producing a beating pulse on the beating tool, and (c) a drive for driving the beating mechanism, wherein the beating mechanism has at least a second beater for producing a beating pulse on the beating tool. According to a second aspect, the invention relates to a method in which a tool of this type is used.

Description of the Prior Art

Hammering devices are used to beat the surface of workpieces, thereby causing a change in their subsurface. This leads to the formation of compressive residual stresses near the surface and potentially structural changes that have a positive influence on the wear behaviour of the workpiece.

DE 10 2006 058 710 A1 describes a processing device for strengthening radius transitions with two actuators that act on respective levers, thereby beating a quill.

AT 364 592 describes a hammering tool with an axially flexible mallet that beats several hinge plates; these then deflect the impact energy in a radial direction.

DE 10 2013 002 495 A1 describes a cold forging device with several beating elements that are stored such that they can be moved radially outwards and individually applied with compressed air.

The disadvantage of the known hammering devices is their low productivity. This has resulted in a general preference for shot peening or deep rolling as a method.

SUMMARY OF THE INVENTION

The invention aims to improve the productivity of hammering.

The invention solves the problem by means of a hammering device according to the preamble, wherein the beating mechanism comprises at least a second beater for producing a beating pulse on the beating tool.

The advantage of this type of hammering device is that a considerably higher beating frequency on the beating tool can be achieved. This means that the productivity of the hammering device can be increased. It is particularly advantageous if, as is intended according to a preferred embodiment, all beaters are driven by the same drive. This results in a structurally simple and yet robust hammering device that enables a high degree of productivity.

Within the scope of the present description, the beating tool should be understood to mean the structural component of the hammering device that comes into direct contact with the workpiece during operation.

The beating mechanism should be understood particularly to mean a device that translates a movement, especially a rotational movement, of the drive into a movement of the beaters. In particular, the drive is a rotary drive, especially an electric motor, hydraulic motor or pneumatic motor.

The beating intensity should be understood to mean a measurement of how hard the beating tool is able to act on the workpiece. A high beating intensity leads to a more pronounced deformation of the subsurface of the workpiece than a low beating intensity. For example, the beating intensity can be described by means of the impact energy. The impact energy is the inherent kinetic energy from the beating tool that is absorbed by the striking pin during its forward movement on the workpiece surface.

It is beneficial if the beating mechanism is a pneumatic beating mechanism. In this case, the beater comprises a striking pin that runs inside a sleeve and is sealed against it. The drive power of the drive moves the sleeve and this transfers the kinetic energy to the striking pin, as is known from electro-pneumatic beating mechanisms. Alternatively, it is possible for the striking pin to be fixed to a holding element by means of a spring, the holding element being periodically moved to and fro during operation.

According to a preferred embodiment, the beating mechanism has a drive shaft that extends along a drive axis and a wobble ring for transforming a rotational movement of the drive shaft into a translational movement. The first beater and the second beater are driven by the wobble ring. The wobble ring preferably comprises a rotatable rim that is connected to the drive such that it is torque-proof, and a torque-proof rim that does not rotate when the rotatable rim rotates. The wobble ring is urged to perform an alternating lift movement by means of the continuous rotational movement of the drive. The transformation of the rotational movement into a translational movement may also occur by means of a crankshaft or a camshaft.

It is especially preferable if the first beater is mounted, such that it is moveable, at a first acute strike angle relative to the drive axis and the second beater is arranged, such that it is moveable, at a second acute strike angle relative to the drive axis.

The first angle is preferably equivalent to the second angle. This should be understood to mean that the first angle, in technical terms, is equal to the second angle, i.e. that it is possible but not necessary for both angles to be equal in mathematical terms. In particular, deviations are tolerable, for example ±3°. In this manner, the beating pulse of the first beater corresponds, in good approximation, to that of the second beater, which leads to especially consistent influencing of the subsurface.

The beating mechanism preferably has at least a third beater for producing a beating impulse on the beating tool, wherein the third beater is arranged, such that it is moveable, at a third acute angle relative to the drive axis, wherein the third angle is equivalent to the first angle and the second angle, wherein the third beater is driven by the wobble ring and wherein at least all beaters are arranged at equidistant angle steps. It is especially beneficial if these equidistant angle steps relate to a plane that runs perpendicular to the drive axis. This type of hammering device emits pulses at equidistant time intervals with a fundamentally constant impact intensity.

According to a preferred embodiment, the wobble ring is arranged at a wobble angle relative to the drive shaft and the beating tool comprises a wobble angle adjustment device for adjusting the wobble angle. By changing the wobble angle, the lift of the beater, in particular of the sleeves, can be changed. The greater the lift, the greater the impact energy at the same speed of the drive shaft. It is thus possible to change the impact intensity without having to change the beating frequency. This leads to a consistently high degree of productivity of the hammering device, independent of the impact intensity.

It is favourable if the hammering device comprises at least one sensor for measuring an impact intensity of strikes of the beater and a control system that is connected to the sensor and wobble angle adjustment device for adjusting the wobble angle and that is configured to control and/or regulate the impact energy so as to produce component-specific, position-dependent controlled and changeable beating pulses for shaping varying surface conditions.

The sensor may refer to an acoustic sensor that records the noise emission produced by a strike of the beater. As the simulated sound intensity is dependent on the impact intensity, the impact intensity can thus be determined.

Alternatively or additionally, the sensor may refer to a speed sensor that identifies the speed of the beater at a defined distance from the point of impact of the head of the hammer. The beating pulse is then determined from the mass of the beater, for example by the control system; this may then serve as parameter and controlled variable. Furthermore, the signal for determining the energy pulse can be used as an assertion about the hammer strike that has actually been executed so as to increase process reliability.

According to a preferred embodiment, the beating mechanism has a riveting pin that is held such that it is limited in its axial movement. Upon manual release, the beating tool can be quickly exchanged for another beating tool. The preferred solution consists of an acceleration sensor and a data transmission by radio and a calculation module, which may be part of the control system and calculates the impact energy from acceleration, deceleration and time.

The beating tool preferably has a first beating element and at least a second beating element, and for every element a cage in which the respective beating element is trapped, and a flowable, incompressible beating pulse transmission agent, which is arranged to transmit the beating pulse from the riveting pin to the beating elements.

The feature that the beating pulse transmission agent is flowable should be particularly understood to mean that it permits a to and fro movement of the beating elements. The beating elements may refer, for example, to balls; the balls are held in a cage that comprises a ball seat, thereby ensuring that the balls do not leave the cage and are thus trapped inside it. The balls protrude above the seat so that they can come into contact with the surface of the workpiece during operation of the hammering device.

The beating pulse transmission agent, which may refer to water, oil, a suspension or a paste, transfers the beating pulse from the riveting pin to the beating elements. Alternatively or additionally, the beating pulse transmission agent may comprise solid bodies, for example spherical bodies, that can be moved relative to each other and which transmit the beating pulse to the surface of the workpiece.

Due to the fact that the beating elements are trapped in their cage such that they can be moved in one direction, they can follow the contour of the workpiece, at least to a certain extent. This ensures that the influence on the workpiece surface is independent of its topography.

The first beating element is preferably arranged to carry out an effective movement in a first effective movement direction, and the second beating element is arranged to carry out a second effective movement in a second effective movement direction, which differs from the first effective movement direction.

Alternatively, it is possible for the effective movement directions to be the same. In this way, according to a preferred embodiment, the intention is that the beating elements are arranged such that at least a majority of them are able to contact a plane. During operation of the hammering device, this plane is the surface of the workpiece. Alternatively or additionally, the beating elements are arranged in the cages such that the beating elements can simultaneously contact an inner surface of a cylinder. If this is the case, an inner surface of a pipe can be hammered.

It is especially advantageous in this case if the hammering device is configured to be rotatable along its longitudinal axis, which may correspond to a longitudinal axis of a pipe when in use. If this is the case, the beating elements are preferably arranged such that they act radially outwards relative to an axis, in particular the drive axis.

It is beneficial if the beating elements are arranged such that they lie flat on an inner wall of a cylinder in a pipe and can hammer the surface of the inner wall of a cylinder. The diameter of the inner wall of the cylinder is preferably at least 20 mm.

If there are three or more beaters, they are preferably arranged such that they are rotationally symmetrical relative to an axis of rotational symmetry, wherein this preferably refers to the drive axis.

The beating tool preferably has at least one pivoted plunger. It is favourable if the pivoted plunger is designed such that it can be pivoted relative to this axis of rotational symmetry. In particular, two pivoted plungers are configured such that two hollows on crankpins and/or main bearing pins of a crankshaft for combustion engines can be processed by way of hammering. The hammering device may then also be described as a crankshaft hammering device.

According to a preferred embodiment, the hammering device has a first hammer that is mounted such that is can be pivoted so that the first hammer carries out an effective movement in a first effective movement direction during operation of the hammering device, and a second hammer that is mounted such that is can be pivoted so that the second hammer conducts a second effective movement direction— different to the first effective movement direction—during operation of the hammering device. According to a second embodiment, the hammering device comprises a number of hammers whose effective movement directions run radially outwards relative to an axis, especially the axis of rotational symmetry or the drive axis.

It is possible and, according to a preferred embodiment, intended that precisely one beater is allocated to each hammer.

BRIEF DESCRIPTION OF THE DRAWINGS

In the following, the invention will be explained in more detail by way of the attached drawings. They show FIG. 1 a longitudinal cut through a hammering device according to the invention and according to a first embodiment, FIG. 1 a partial cross section along the line B-B according to FIG. 1, which depicts a possible division of the beating tool into individual tools, FIG. 2 a cross section along the line A-A from FIG. 1, FIG. 3 the impact energy dependent on a rotational frequency of the drive, FIG. 4 a cross section of a hammering device according to the invention and according to a second embodiment, FIG. 5a a cross section through a third embodiment of a hammering device according to the invention and FIG. 5b a cross section relative to the line of intersection C-C.

FIG. 10 shows a hammering machine according to the invention with a hammering device according to the invention.

DETAILED DESCRIPTION OF THE DRAWINGS

Figures 1, 1A, 2, 3:
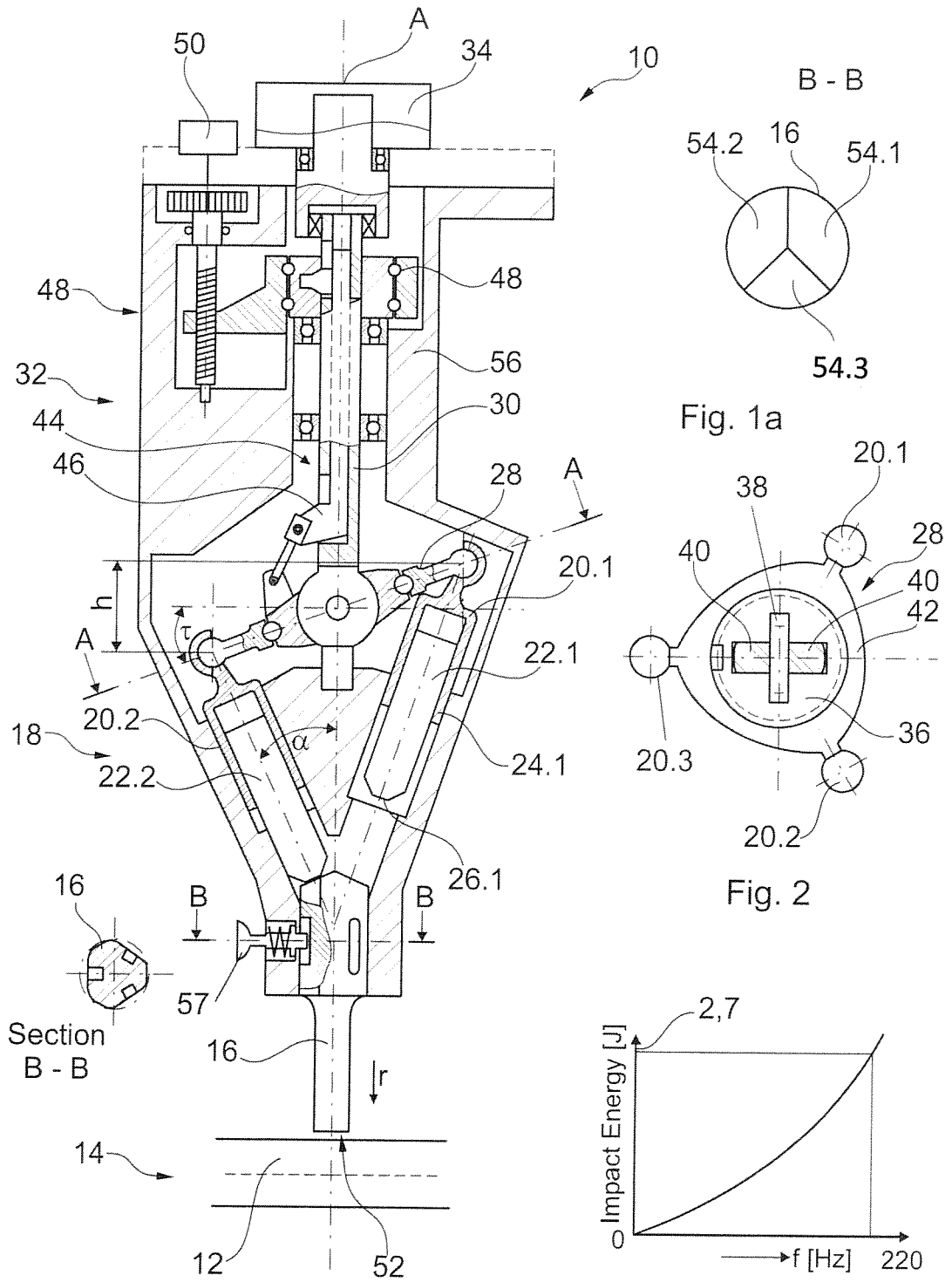

FIG. 1 depicts a longitudinal cut through a hammering device 10 according to the invention for influencing a subsurface 12 of a workpiece 14. The hammering device 10 comprises a beating tool 16 in the form of a chisel made of carbide or hardened steel.

The hammering device 10 has a beating mechanism 18 that comprises a first beater 20.1, a second beater 20.2 and a third beater 20.3, not depicted in FIG. 1 (see FIG. 2). It has been proven that three is a suitable number of beaters; however, it is also possible for the beating mechanism to have four, five or more beaters.

The beaters 20.1, 20.2 and 20.3 each have a striking pin 22.1, 22.2 and 22.3, i.e. the beater 20.1 has a striking pin 22.1. The striking pin 22.1 is housed in a sleeve 24.1 and sealed against it. The striking pin 22.1 has a striking end 26 with which it beats the beating tool 16 or a riveting pin, not depicted in FIG. 1.

The end of the beater 20.1, 20.2 or 20.3 that lies opposite the striking end 26.1 is fixed to a wobble ring 28, which is driven by a drive shaft 30 that is mounted in the same way about a drive axis A such that it can be rotated. The drive shaft 30 is part of a drive 32 that also has a schematically depicted motor 34, especially an electric motor.

In another embodiment, the shaft 30 can also be driven by the working spindle of a tool machine. A tool machine with a working spindle that comprises a hammering device according to the invention and that is connected to it for the purpose of driving is also subject of the invention.

FIG. 1 shows that the first beater 20.1 is mounted, such that it is moveable, at a first striking angle .alpha.1 relative to the drive axis A. During operation, the striking pin 22.1 conducts a movement that runs at the striking angle .alpha.1 to the drive axis A. If the drive is activated, the sleeves encasing the striking pins oscillate. If, for example, the sleeve 24.1 moves towards the beating tool 16, the striking pin 22.1 is pushed into the sleeve such that the air pressure between the sleeve and striking pin becomes so great that the striking pin on the beating tool becomes too accelerated and strikes it. If the sleeve 24.1 moves back, the resulting negative pressure causes the striking pin 22.1 to be moved away from the beating tool 16.

The second beater 20.2 is mounted, such that it is moveable, at a second striking angle α2 relative to the drive axis A, wherein α1=α2 is applicable in the present case.

FIG. 2 shows a cross section along the line A-A through the wobble ring 28. It should be recognised that the wobble ring 28 has a rotatable rim 36 that is hinged on the drive shaft 30, in the present case by means of a hinge bolt 38 and a catch 40. The wobble ring 28 also has a torque-proof rim 42 onto which the beaters are hinged.

It can be seen in FIG. 1 that, by turning the drive shaft 30, the sleeves carry out a lift movement with a lift h. The lift h is dependent on a wobble angle T, which is measured relative to a vertical of the drive axis A. If .tau.=0.degree. applies for the wobble angle, then h=0 mm. If the wobble angle .tau., which by definition is greater than 0, increases then the hub h also increases.

The drive 32 comprises a wobble angle adjustment device 44. In the present case, this has an adjustment rod 46 that runs along the drive axis A and rotates with the drive shaft 30. The adjustment rod 46 is situated above a pivot bearing 48, in conjunction with an actuator 48 which may have a servomotor 50. Alternatively, the actuator 48 may also be activated by hand. By activating the actuator 48, the adjustment rod 46 can be shifted along the drive axis A so that the wobble angle τ changes.

The detailed diagram at the bottom left of FIG. 1 shows a cut along the line B-B through the beating tool 16. It should be recognised that, in the current case, this is configured as a single piece, i.e. that all beaters 20.1, 20.2, 20.3 lead to a movement of a tool head 52.

As shown in FIG. 1a, the beating tool 16 may, according to an alternative embodiment, have a first hammer 54.1, a second hammer 54.2 and a third hammer 54.3. The hammers 54.$i$ ($i$=1, 2, . . . ) may be designed such that together they form the beating tool 16 and could therefore also be described as partial beating tools.

The hammers 54.$i$ are arranged in such a way that they can be struck respectively by precisely one beater. In this way, the hammer 54.1 is only struck by the beater 20.1, for example. The heads of the hammers 54, i.e. the heads of all hammers 54.1, 54.2, 54.3, together form a joint tool head 52 (compare FIG. 1). The tool head 52 is preferably rounded to a conical shape.

FIG. 1 shows that the beating tool 16 is fixed on a housing 56 of the hammering device such that it is axially moveable relative to the drive axis A. In the present case, a locking system 57 also catches in a slit in the beating tool 16.

FIG. 3 illustrates the dependency of the impact energy E on a rotational frequency f of the drive 32. It should be recognised that the impact energy E increases in a strictly monotonous manner with the rotational frequency f. This dependency applies when the wobble angle τ is constant. It is possible to reduce the impact energy E by reducing the wobble angle τ. This renders it possible to work consistently with the maximum possible rotational frequency f of e.g. 4000 rotations per minute and to still reduce the impact energy E if required.

Figure 4:
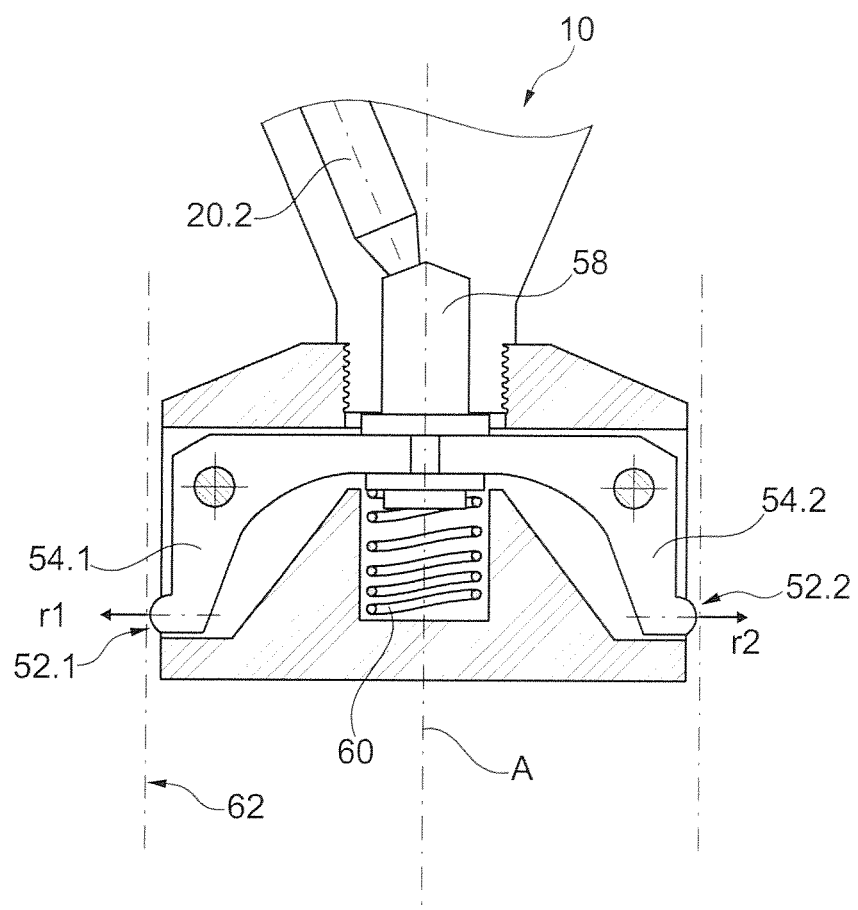

FIG. 4 shows part of a hammering device 110 according to the invention according to a second embodiment, It should be recognised that the beaters, of which only the beater 20.2 is depicted, strike a riveting pin or anvil 58 that transfers the beating pulse to a number of hammers in the form of switch cams 54.1, 54.2, . . . . The riveting pin 58 is dispensable, especially if precisely one beater 20.1 is available for each hammer 54.1, with the beater striking this hammer 54.1.

The hammers 54.1 are mounted such that they can be pivoted so that they carry out an effective movement in an effective movement direction n, which runs radially outwards relative to the drive axis A. The hammers are preloaded by a spring 60 when in the neutral position, in which the relevant tool heads 52 lie radially inwards. The beating pulses are then transmitted radially outwards, for example on a pipe interior 62 of a pipe, which represents the workpiece to be processed.

Figure 5A:
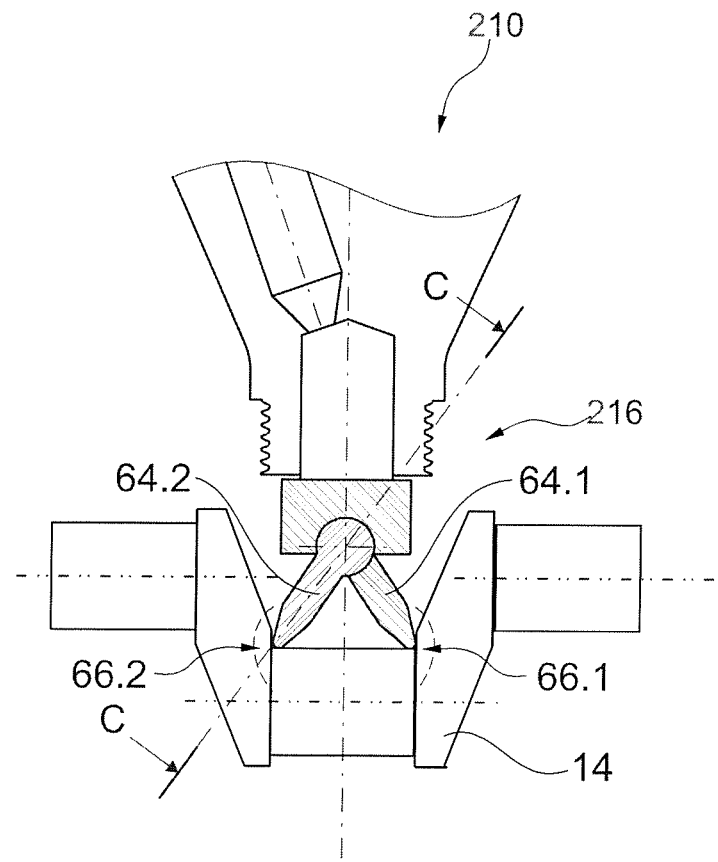

FIG. 5a depicts a lower section of a hammering device 210 according to the invention according to a further embodiment, wherein the beating tool 216 comprises at least one pivoted plunger 64.1 and/or 64.2. The plungers 64.1 and 64.2 are configured such that a corresponding hollow 66.1 and 66.2 in a workpiece 14 in the form of a crankshaft can be processed.

It should be recognised that the beating tool 216 may have a pivoted plunger 64.1 or—as in the present case—two pivoted plungers 64.1, 64.2 for processing hollows 66.1, 66.2. The hollows 66.1, 66.2 are placed at junctions of a crankpin to each adjacent crank web or bearing journal and crank web. A method according to the invention refers to the processing of hollows in crankshafts using a hammering device 210 according to the invention.

Figure 5B:
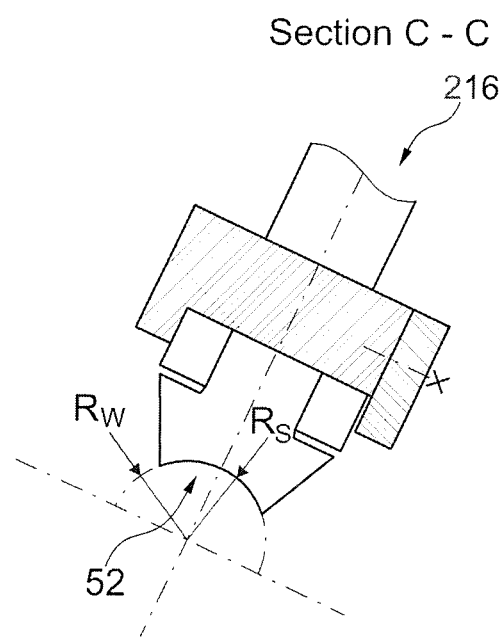

FIG. 5b depicts an alternative embodiment for a beating tool 216 of a hammering device according to the invention where the tool head 52 is designed to be concave. The radius of a circle of curvature $R_s$ of the tool head 52 is, for example, equal or slightly greater than the half radius $R_w$ of the crankpin.

Figure 6:
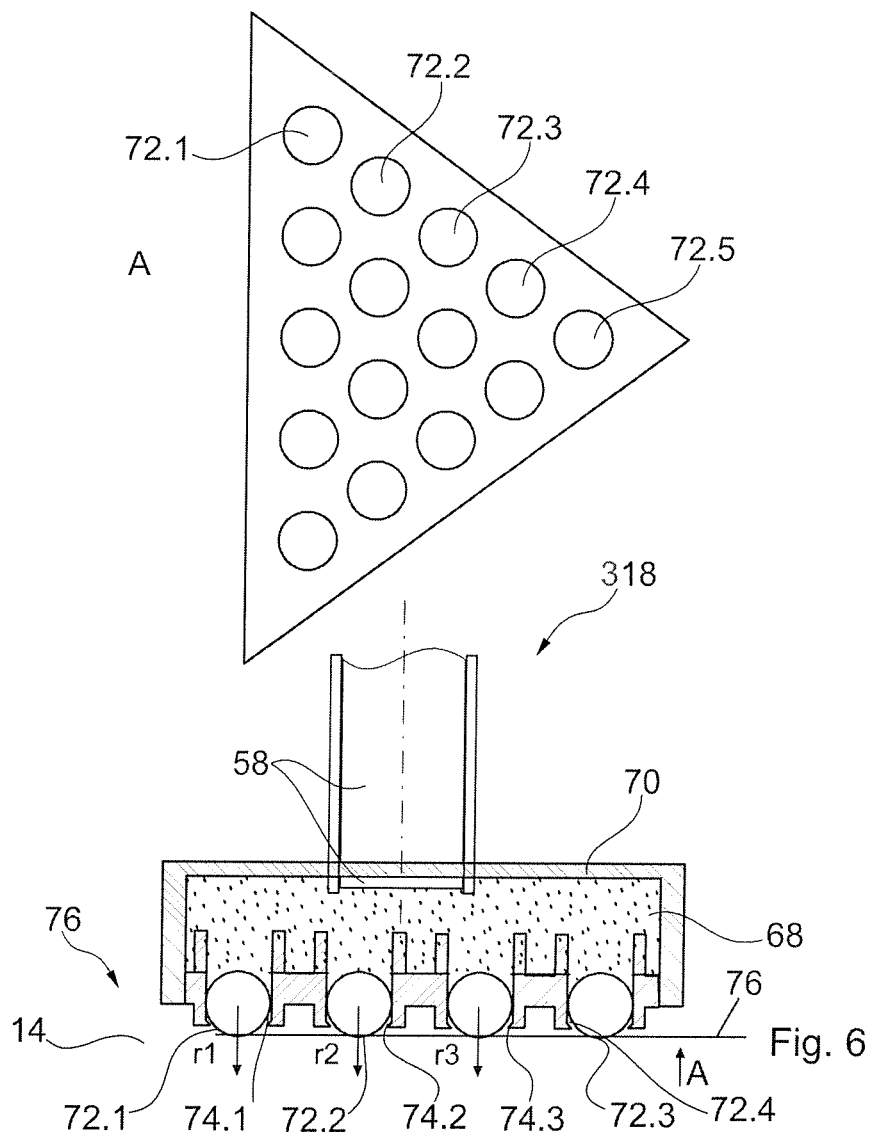
FIG. 6 depicts a cross section through a part of a beating mechanism of a hammering device according to the invention FIG. 7 a schematic cross section through another beating mechanism, FIG. 8 a part of a hammering device according to the invention and FIG. 9 a schematic diagram of a control system of a hammering device according to the invention.

FIG. 6 shows a cross section through a part of a beating mechanism 318 of a hammering device according to the invention. In this embodiment, the riveting pin 58 directs the beating pulse of the beater to a flowable, incompressible beating pulse transmission agent in the form of an oil with a viscosity of 100 Pas at 25.degree. C. It is beneficial if the viscosity of 100 Pas at 25.degree. C. has a value of at least 80 Pas, in particular at least 200 Pas. A viscosity below $10.\text{sup}.5$ Pas is advantageous.

The beating pulse transmission agent 68 is arranged in a housing 70 and is in contact with a number of beating elements 72.1, 72.2, . . . . Each beating element 72 is trapped in a cage 74.1, 74.2, 74.3 that permits a movement in a translational direction, in the present case in a movement from up to down. Conversely, the translational movements in the respective different directions are prevented.

The beating pulses transmitted by the riveting pin 58 are transmitted to the beating elements such that they move in an effective movement direction r that is oriented radially outwards, thereby transmitting the beating pulses to a surface 76 of the workpiece. In this embodiment, the beating elements lie along one plane that corresponds to the even surface 76. The upper partial image shows a view of the beating tool 318 from below.

Figure 7:
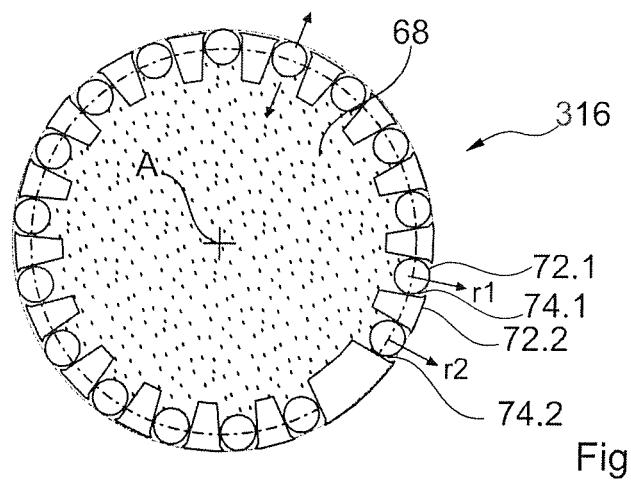

FIG. 7 depicts a schematic cross section through another beating tool 316 that comprises a number of beating elements 72.1, 72.2, . . . which are moved radially outwards relative to the axis A when the riveting pin, not depicted in FIG. 7, transmits a beating pulse on the beating pulse transmission agent 68; the beating elements can then hammer the inner side of a pipe. In this embodiment, the beating elements lie along an inner surface of a cylinder that corresponds to the inner surface of the workpiece to be processed.

Figure 8:
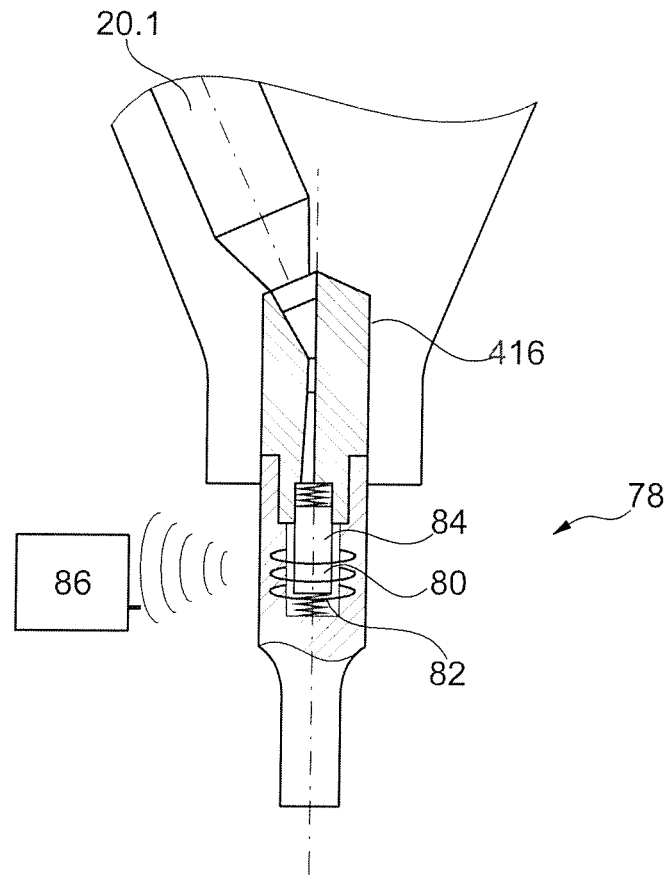

FIG. 8 shows a part of a hammering device according to the invention that has a sensor 78 for measuring the beating intensity of beats of the beater 20.1. The sensor 78 comprises a test mass 80, which is arranged in the beating tool 416 in the present case. Alternatively, the sensor 78 may also be arranged in the riveting pin 58 (compare FIGS. 4 and 6).

If the beater 20.1 strikes the beating tool 416, it results in a relative movement between the test mass 80 and the remaining beating tool. As a result of the movement of the mass 80 relative to the remaining tool, an electric current is induced in a coil 82 that is proportional to the speed of the test mass relative to the remaining part of the beating tool 416. This signal is strengthened by an amplifier 84 and transmitted to a control system 86, for example by radio.

Figure 9:
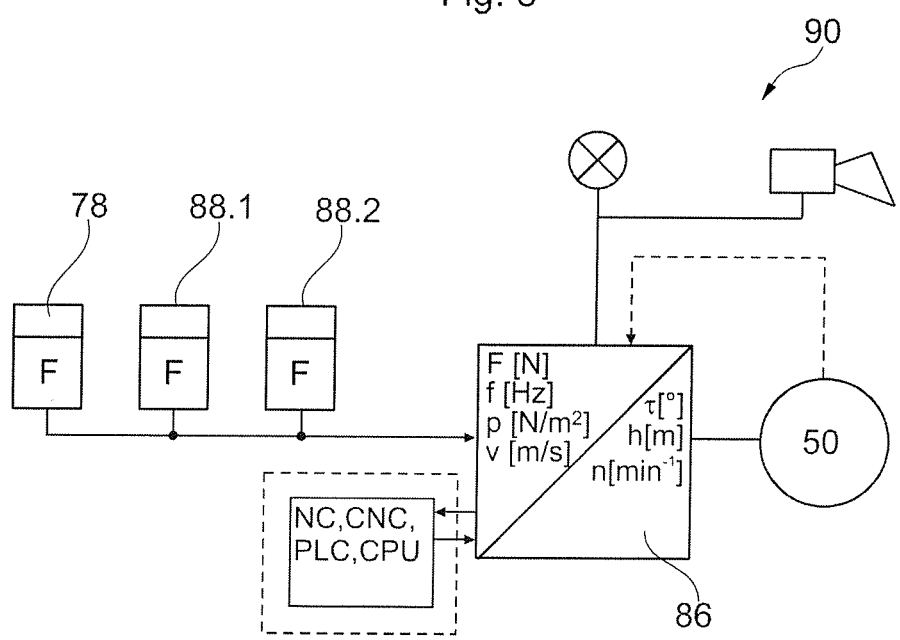

FIG. 9 schematically shows that the sensor 78, as well as possible additional sensors 88.1, 88.2 are connected to the control system 86. The control system 86 compares the incoming sensor signal with a predetermined target signal and controls the servomotor 50 such that the impact energy E approaches the predetermined target value $E_{Soll}$.

Optionally, the control system 86 is connected to at least one signal device 90 for emitting an optical and/or acoustic warning signal if the deviation between the actual value $_{Ist}$ of the impact energy exceeds the predetermined target value $E_{Soll}$ by a predetermined value.

For component-specific, position-dependent, controlled and changeable surface modelling, the control system 86 produces a signal exchange using a superordinate control system, such as a machine control system, programming code or computer, to condition each pulse. Information relating to this aspect is also transmitted via the process status. According to the invention, this also incorporates a tool machine or a robot that comprises a hammering device according to the invention and is configured to move the hammering device along a predetermined path on the workpiece.

Furthermore, the control systems 86 may be equipped with a storage unit for recording the impact energy allocated to each point of the processing surface. This renders it possible to track the processing for the sake of quality management. In other words, a tool machine according to the invention preferably has a machine control system in which a trajectory is stored which sets off the hammering device during the processing of the workpiece. According to a preferred embodiment, an impact energy is stored, at least for several points of the trajectory, in the machine control system or the control system of the hammering device, and the hammering device is designed for hammering the workpiece with the predetermined impact energy.

FIG. 10 depicts a hammering machine 92 according to the invention that comprises a workpiece accommodation 94 for receiving the workpiece 14, a hammering device 10 according to the invention and a positioning device 96 for the guided positioning of the hammering device 10 relative to the workpiece 14. The positioning device 96 has several schematically depicted machine axes 98.1, 98.2, 98.3 that—as shown in the case in FIG. 10—may be axes of rotation; however, that is not necessary. Alternatively or additionally, at least one of the machine axes may be a translational axis.

The hammering machine 92 may be designed as a robot. It has a machine control system 100 that controls drives of the machine axes in such a way that the hammering device 10 is moved along a predetermined trajectory. For example, the predetermined trajectory is stored in a digital memory of the machine control system 100. In addition, the workpiece accommodation 94 may have a drive, by means of which the workpiece 14 can be rotated. Using the hammering machine 92, the workpiece can be hammered in predetermined areas such that the residual stress of the workpiece 14 changes.

The invention claimed is:

1. A hammering device for influencing subsurfaces of workpieces, comprising:
 a beating tool for acting on a workpiece; and
 a beating mechanism that comprises
  a first beater for generating a beating pulse on the beating tool,
  a first drive for driving the beating mechanism,
  at least a second beater for generating a beating pulse on the beating tool,
  a drive shaft that extends along a drive axis of the beating tool, and
  a wobble ring having a rotatable ring driven by the drive shaft for transforming a rotational movement of the drive shaft into a translational movement, the wobble ring having a torque-proof rim onto which the first and said at least second beaters are hinged, wherein the first beater and said at least second beater are driven by the wobble ring.

2. The hammering device according to claim 1, wherein the first beater is moveably mounted at a first striking angle relative to the drive axis,
the second beater is moveably mounted at a second striking angle relative to the drive axis.

3. The hammering device according to claim 1, wherein the wobble ring is mounted to the drive shaft at a wobble angle relative to the drive shaft, and
a second drive comprises a wobble angle adjustment device for adjusting the wobble angle.

4. The hammering device according to claim 3, further comprising:
at least one sensor for measuring an impact intensity of beats of the first and second beaters; and
a control system connected to the at least one sensor and the wobble angle adjustment device for adjusting the wobble angle, wherein the control system is configured to control and/or regulate impact energy.

5. The hammering device according to claim 1, wherein the beating mechanism comprises a riveting pin, and the beating tool comprises
a first beating element,
at least a second beating element,
a first cage for the first beating element and a second cage for the at least a second beating element in which the first beating element and the at least a second beating element is trapped in respective first and second cages and the first beating element and the at least a second beating element are each moveable in one direction, and
a flowable, incompressible beating pulse transmission agent that is arranged to transmit the beating pulse from the riveting pin to one or more of the first beating element and the at least a second beating element.

6. The hammering device according to claim 1, wherein the first beater moves in a first direction, and
the second beater moves in a second direction that is different to the first direction.

7. The hammering device according to claim 1, wherein that the beating tool comprises a pivoted plunger.

8. The hammering device according to claim 1, wherein the beating tool has a first hammer and at least a second hammer that can be moved relative to one another,
the first hammer is pivoted and moves in a first direction during operation of the hammering device, and
the second hammer is pivoted and moves in a second direction which is different to the first direction, during operation of the hammering device.

9. A hammering machine, comprising:
a workpiece accommodation for receiving a workpiece,
a hammering device comprising:
a beating tool for acting on the workpiece; and
a beating mechanism that comprises
a first beater for generating a beating pulse on the beating tool,
a drive for driving the beating mechanism,
at least a second beater for generating a beating pulse on the beating tool,
a drive shaft that extends along a drive axis, and
a wobble ring having a rotatable ring driven by the drive shaft for transforming a rotational movement of the drive shaft into a translational movement, the wobble ring having a torque-proof rim onto which the first and the at least second beaters are hinged, wherein the first beater and the at least second beater are driven by the wobble ring, and
a positioning device for guided positioning of the hammering device relative to the workpiece.

* * * * *